Patented Sept. 13, 1932

1,876,886

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

FUSIBLE PLASTIC AND PROCESS OF MAKING SAME

No Drawing. Application filed January 9, 1925, Serial No. 1,497. Renewed June 20, 1931.

This invention relates to molding compositions and to molded articles made therefrom and to a chill-molding process of making such articles; the products embraced hereunder containing a synthetic resin, preferably of the fusible type, as a binding agent; with which preferably, but not necessarily, there may be incorporated a cellulose ester, or mixture of cellulose esters, likewise as filler.

Such esters are employed as strengthening and toughening agents and when used it is best to employ a synthetic resin which will blend and be compatible with nitrocellulose in order to secure maximum strength, good flowing qualities and smooth surface finish. Hydrocarbon resins, such as those made by the polymerization of solvent naptha (the so-called cumaron resins) are in general excluded, as a major resin but may be added in minor proportions especially when a truly compatible resin is present. Artificial resins of the modified natural resin type, such as rosin ester or "ester gum" may be used in somewhat larger proportion but are not as effective as the more truly synthetic resins which will be hereinafter described. Rosin ester occupies a place intermediate the relatively unblendable hydrocarbon resins and the truly blendable synthetic resins.

The cellulose ester optionally employed is nitrocellulose in its various forms, e. g. nitrocotton, pyroxylin, gelatinated nitrocellulose such as smokeless powder, celluloid, film scrap and other celluloid waste and used moving picture film. Nitrocellulose of high and low nitrogen content may be used. Nitrocellulose or celluloid which has been heat treated or chemically treated to reduce viscosity likewise may be employed. When impregnating a filler with a solution of nitrocellulose, such viscosity products are desirable as less solvent is required.

Other cellulose esters or cellulose ethers may be employed. When nitrocellulose is used it may be incorporated by dissolving in a suitable solvent, e. g. ethyl acetate, acetone, alcohol, composite solvents etc. mixing the solution with the other ingredients of the composition, evaporating and recovering the solvent. In some cases the ester may be incorporated on warm mixing rolls (rubber milling rolls) without solvent.

As an example of certain synthetic resins of the permanently fusible type are those produced from a polyhydroxy body such as glycerol and two or more organic acids or anhydrides, one of which may be a polybasic acid and the other a monobasic acid. Of the polybasic acids I preferably employ phthalic acid or its anyhydride although other polybasic acids such as malic, maleic, citric, tartaric, etc. may be substituted. Numerous monobasic acids may be used such as for example salicylic, benzoic, lactic, oleic, stearic etc. and in place of a pure monobasic acid I may also employ a natural resin of acidic nature such as for example rosin or congo.

In some cases I may employ a resin made from glycerol and a polybasic acid without the addition of a monobasic acid. A resin of this kind may be employed when the manipulative operations during molding do not preclude products hardening on heating or when the recovery of scrap is not important. By using a permanently fusible resin the scrap, fins or trimmings etc. may be re-used, with consequent saving. Also in carrying out the molding, a preferred method herein is to keep a mass of the composition in a plastic state by heating on a hot plate and taking from this stock, from time to time, portions required for molding the articles. A resin which quickly sets on heating in this manner is not appropriate under such conditions.

The use of glycol or polyhydric substances other than gylcerol is within the purview of my invention and these may be substituted for glycerol or admixed therewith in some cases.

Suitable resins may be prepared by heating a mixture of glycerol and the corresponding acids or acid resins to a temperature of approximately 290° C., using mechanical agitation. The temperature is raised slowly, the exact time depending upon the size of the batch being prepared. The batch is cooled preferably under vacuum so as to remove as much as possible of unreacted acid and such treatment also aids in the production of light colored resins where such are desired. In most cases I prefer to use a slight excess of glycerol in order to secure a resin of low acidity and also to avoid waste of acid. For example I find that a very satisfactory salicylic phthalic glyceride resin may be prepared from one mol. of glycerol and four-fifths of a mol. each of salicylic acid and phthalic anhydride. I prefer also to use approximately equal molecular proportions of a polybasic and monobasic acid since this proportion in most cases tends to provide a permanently fusible resin. Frequently the fusibility may be increased by the use of a larger proportion of monobasic acid and decreased by the use of a larger proportion of polybasic acid.

Among the various resinous complexes which I recommend for use in the improved molding compositions are, salicylic phthalic glyceride, benzoic phthalic glyceride, rosin phthalic glyceride, congo phthalic glyceride, rosin congo phthalic glyceride and in some cases phthalic glyceride resin itself.

When nitrocellulose forms an ingredient of the composition I prefer a resin of low acid number, preferably below 20°. This lends to stability of the molded article. Anti-acids may be present, as specially adding neutralizing substances, such as urea or aniline, or as fillers of an acid absorbing character such as whiting or zinc oxide. Adding aniline or toluidine to the resin and heating will reduce the acid number and in this way a practically neutral resin may be obtained.

Another method of reducing the acid number to render the resin better adapted for incorporating with nitrocellulose is that of protracted heating at a temperature between 200° C. and 300° C. The acid number falls to a low point, usually below 10 and sometimes below 5. At the same time the resin becomes harder and acquires a somewhat higher melting or softening point which often is desirable. Several hours heating may be required to effect the desired reduction in acid number and increase in hardness. The color usually is deepened.

In most cases I prefer to employ a filler in the molding composition but do not exclude the production of molded articles without any filler.

Many different fillers may be employed and usually each type of article requires a different mixture. As examples of the many fillers the following are given:—wood flour, cotton linters, asbestos fibre, rottenstone, mica dust, terra alba, china clay etc. Various pigments are also employed. Since light-stable resins may be made according to the foregoing, it is possible to make useful white or delicately-tinted articles in accordance with the present invention.

For illustration of my invention I submit the following representative formulæ of molding compositions.

No. 1

Mica dust_____ 12 parts by weight
Terra alba_____ 8 parts
Salicylic phthalic glyceride resin___ 8 parts
Cotton flock_____ ¾ part
Lamp black_____ 1 part

No. 2

Rottenstone_____ 8 parts by weight
Terra alba_____ 12 parts
Rosin phthalic glyceride resin___ 6¾ parts
Cotton flock_____ ¾ part
Coloring agent_____ 1½ parts

No. 3

Terra alba_____ 20 parts by weight
Congo phthalic glyceride resin___ 6½ parts
Cotton flock_____ 1 part
Coloring agent_____ ½ part One suitable formula in which I utilize nitrocellulose is:—

Mica dust_____ 12 parts by weight
Terra alba_____ 8 parts
Rosin phthalic glyceride resin_____ 8 parts
Nitrocellulose_____ 2 parts
Asbestos fibre_____ 1 part
Lamp black_____ 1 part The proportion of nitrocellulose to resin may be varied so that either one or the other may be in excess. In general however I prefer to use a minor proportion. Ordinarily 10 per cent of nitrocellulose (on the weight of the resin) considerably increases the strength. The increment in strength with further additions of nitrocellulose does not appear to be in proportion to the amount thereafter added. The rate of strength increase is less relatively as the proportion of nitrocellulose increases.

One method of preparing the molding compositions is by incorporating the resin with fillers on hot rolls which effects a thorough mixture. The hot molding composition may then be formed into sheets and allowed to cool after strips of suitable size have been cut. In the molding operation a strip of the sheeted composition of the requisite size is heated on a hot plate to a point where it is readily shaped by pressure. The heated piece is then inserted into a warm mold, the mold placed in a hydraulic press the platens of which are cooled by means of running water. A pressure of 2000 pounds per square inch is then applied and pressure maintained until the molded article has set. The article then is removed from the mold.

Chill-molding has the advantage that pre-warming on the hot plate is not limited to any time interval so that the mass may be permitted to remain on the heater until heated uniformly throughout. Thus it is rendered uniformly plastic and when placed in a warm mold and introduced into the chill press is in the best possible condition to receive an exact impress of the mold. Hot-pressing on the other hand heats the composition in the mold from outside towards the center during a very briefly-limited period, that which is permitted in the cycle of molding operations looking to rapid production. Consequently the interior of the molded article is prone to receive less heat than the exterior portions. Synthetic resins of a substantially permanently fusible type such as the glycerol-organic acid resins illustrated herein molded by chill pressing have given no evidence of warping or internal stresses.

Another method of preparing the molding composition is to impregnate the filler with a solution of the resin in a suitable solvent and subsequently evaporate the solvent but this procedure is not used except when special products are desired or when it is difficult to work the composition on hot rolls. Molding composition prepared by either method or in any other manner appropriate to the present invention may be ground and employed as a powder, instead of sheet, for molding.

The above described pressing method is the preferred form hereunder and is embodied in certain of the claims. The method of molding in a chilling-press may be described as cold-pressing or chill-pressing a pre-warmed plastic, that is one which has been heated and rendered plastic primarily by heat applied from an external source, instead of in the press itself. The process is not limited by the specific details given in the illustration. The invention moreover is not limited from all standpoints to cold-shaping or chill-molding a pre-warmed plastic since molding the composition described also may be carried out in other ways, as by hot-pressing. The composition is however especially adapted to "cold-shaping" by virtue of its properties.

What I claim is:—

1. The process which comprises incorporating a glycerol-organic acid resin of a substantially permanently fusible character with a filler, warming the mixture to render plastic, placing in a mold and pressing while chilling.

2. The process which comprises incorporating a glycerol-organic acid resin of a substantially permanently fusible character with nitrocellulose and a filler, warming the mixture to render plastic, placing in a mold and pressing while chilling.

3. A molding composition comprising a cellulose ester, a filler and a substantially permanently fusible synthetic resin compatible with nitrocellulose.

4. A molding composition comprising a cellulose ester and a substantially permanently fusible synthetic resin compatible with nitrocellulose.

5. A molding composition comprising a cellulose ester and a substantially permanently fusible synthetic resin compatible with nitrocellulose, said resin being in proportion greater than the cellulose ester.

6. A molded article comprising nitrocellulose and a synthetic resin compatible therewith and of low acidity; whereby a stable product results.

7. A chill-molded article comprising a cellulose ester, a filler and a substantially permanently fusible synthetic resin compatible with nitrocellulose.

8. A chill-molded article comprising a cellulose ester and a substantially permanently fusible synthetic resin compatible with nitrocellulose.

9. A molding composition comprising nitrocellulose of low viscosity, and a phthalic resin of low acid number.

10. A molding composition comprising nitrocellulose a filler, and an organic acid-glycerol resin of low acid number.

11. A molding composition comprising nitrocellulose, and an aniline-treated glycerol-organic acid resin of low acid number.

12. The process which comprises chill pressing a pre-warmed sheeted composition containing a phthalic resin and a filler.

13. The process which comprises incorporating a glycerol-organic acid resin with nitrocellulose, and chill-pressing the composition.

14. A chill-molded article comprising nitrocellulose and a substantially permanently fusible synthetic resin.

15. A molded article comprising a substantially permanently fusible synthetic phthalic resin toughened with a composition containing ntirocellulose.

16. A molded article comprising a substantially permanently fusible glycerol-organic acid resin toughened with at least 10% of nitrocellulose.

17. A composition adapted for molding comprising a cellulose ester and a polyhydric alcohol, polybasic acid, monobasic acid resin.

18. A molded article comprising a cellulose ester and a polyhydric alcohol, polybasic acid, monobasic acid resin.

19. A composition adapted for molding comprising a cellulose ester and a permanently fusible artificial resin of the modified natural resin type.

CARLETON ELLIS.